(12) United States Patent
Takahashi

(10) Patent No.: US 11,099,124 B2
(45) Date of Patent: Aug. 24, 2021

(54) GAS ANALYSIS APPARATUS, PROGRAM FOR GAS ANALYSIS APPARATUS, AND GAS ANALYSIS METHOD

(71) Applicant: HORIBA, Ltd., Kyoto (JP)

(72) Inventor: Motonobu Takahashi, Kyoto (JP)

(73) Assignee: HORIBA, LTD., Kyoto (JP)

( * ) Notice: Subject to any disclaimer, the term of this patent is extended or adjusted under 35 U.S.C. 154(b) by 547 days.

(21) Appl. No.: 16/020,421

(22) Filed: Jun. 27, 2018

(65) Prior Publication Data

US 2019/0017927 A1     Jan. 17, 2019

(30) Foreign Application Priority Data

Jul. 14, 2017    (JP) .............................. JP2017-138276

(51) Int. Cl.
*G01N 21/25* (2006.01)
*G01N 21/3504* (2014.01)
(Continued)

(52) U.S. Cl.
CPC ....... *G01N 21/3504* (2013.01); *G01N 21/255* (2013.01); *G01N 21/274* (2013.01); *G01N 2021/3595* (2013.01)

(58) Field of Classification Search
CPC ....... G01N 21/3504; G01N 2021/3595; G01N 21/255; G01N 21/274; G01N 35/00693
(Continued)

(56) References Cited

U.S. PATENT DOCUMENTS

| 6,748,334 B1 | 6/2004 | Perez et al. |
| 2005/0267694 A1* | 12/2005 | Buckley ............... G01N 21/718 702/24 |

(Continued)

FOREIGN PATENT DOCUMENTS

| CN | 102183482 A | 9/2011 |
| EP | 2177895 A2 | 4/2010 |

(Continued)

OTHER PUBLICATIONS

Office Action dated Aug. 27, 2020 issued for Japanese Patent Application No. 2017-138276, 12 pgs.
(Continued)

*Primary Examiner* — Jeffrey P Aiello
(74) *Attorney, Agent, or Firm* — Brooks Kushman, P.C.

(57) ABSTRACT

A gas analysis apparatus includes a calibration curve data storage section designed to store N types of calibration curve data which are previously created for N types of measurement target components and obtained by correcting influences of other N−1 types of measurement target components with respect to a concentration of each of the measurement target components, and a concentration calculation section designed to calculate a concentration of each of the measurement target components by using the N types of calibration curve data. When there exists a subthreshold component whose concentration calculated by the concentration calculation section is not more than a predetermined threshold value, the concentration calculation section calculates a concentration of each of the measurement target components other than the subthreshold component by using calibration curve data obtained without correcting an influence of the subthreshold component.

9 Claims, 7 Drawing Sheets

(51) Int. Cl.
*G01N 21/27* (2006.01)
*G01N 21/35* (2014.01)

(58) Field of Classification Search
USPC ...... 250/282; 422/67, 82.05, 83; 702/19–25, 702/104
See application file for complete search history.

(56) References Cited

U.S. PATENT DOCUMENTS

| | | | |
|---|---|---|---|
| 2008/0223109 A1* | 9/2008 | Nitta | G01N 21/3504 73/23.2 |
| 2009/0213380 A1* | 8/2009 | Appel | G01N 21/3504 356/437 |
| 2013/0166225 A1* | 6/2013 | Itaya | G16C 20/10 702/24 |
| 2013/0311108 A1* | 11/2013 | Stetter | A61B 5/0205 702/22 |
| 2016/0097712 A1* | 4/2016 | Shimizu | G01N 21/274 702/19 |
| 2016/0115508 A1* | 4/2016 | Fasan | A61P 35/00 514/232.8 |
| 2017/0115219 A1* | 4/2017 | Ido | G01J 3/10 |
| 2017/0205336 A1* | 7/2017 | Ido | G01N 21/39 |
| 2017/0355187 A1* | 12/2017 | Hashimoto | B41J 2/04586 |
| 2019/0017927 A1* | 1/2019 | Takahashi | G01N 21/3504 |

FOREIGN PATENT DOCUMENTS

| | | | |
|---|---|---|---|
| JP | 2649667 B | | 9/1997 |
| JP | 2926277 B | | 7/1999 |
| JP | H 04262236 A | * | 7/1999 |
| JP | 2000-241313 A | | 9/2000 |
| JP | 2002-350339 A | | 12/2002 |
| JP | 2008-224598 A | | 9/2008 |
| JP | 2008224598 A | * | 9/2008 |
| JP | 2012-002799 A | | 1/2012 |
| JP | 2012-189550 A | | 10/2012 |
| JP | 2013-130488 A | | 7/2013 |
| JP | 2013-537307 A | | 9/2013 |
| WO | 2012-036970 A1 | | 3/2012 |

OTHER PUBLICATIONS

EESR dated Oct. 24, 2018 issued for European Patent Application No. 18 181 618.2, 9 pgs.
Rekha Gautam et al., Review of Multidimensional Date Processing Approaches for Raman and Infrared Spectroscopy, EPJ Techniques and Instrumentation, Jun. 2, 2015, vol. 2, No. 1, 38 pgs.
J. M. Andrade et al., A Tutorial on Multivariate Calibration in Atomic Spectrometry Techniques, Journal of Analytic Atomic Spectrometry, Jan. 1, 2008, vol. 23, No. 1, pp. 15-28.
Da Chen et al., Removal of Major Interference Sources in Aqueous Near-Infrared Spectroscopy Techniques, Analytical and Bioanalytical Chemistry, May 1, 2004, vol. 379, No. 1, pp. 143-148.ky.

* cited by examiner

GAS ANALYSIS APPARATUS, PROGRAM FOR GAS ANALYSIS APPARATUS, AND GAS ANALYSIS METHOD

CROSS-REFERENCE TO RELATED APPLICATION

This application claims priority to Japanese Application No. 2017-138276, filed Jul. 14, 2017, the disclosure of which is incorporated in its entirety by reference herein.

BACKGROUND OF THE INVENTION

Field of the Invention

The present invention relates to a gas analysis apparatus, a program for a gas analysis apparatus, and a gas analysis method.

Background Art

As a conventional gas analysis apparatus, there is, as disclosed in Patent Document 1, one which is designed to calculate concentrations of measurement target components contained in a sample gas by carrying out a multivariate analysis using an absorption spectrum obtainable by irradiating light to the sample gas. The gas analysis apparatus uses, for example, Fourier transform infrared spectroscopy (FTIR) method.

The analysis using the FTIR method has such a merit that it is possible to continuously and simultaneously analyze multiple components contained in the sample gas. For example, when used in the field of engine exhaust gas, the exhaust gas as a sample gas is analyzable by being directly introduced into a sample cell. This leads to an advantage that it is possible to carry out so-called wet measurement intended to calculate concentrations of the measurement target components in a state in which moisture is contained in the exhaust gas.

Meanwhile, calibration curve data indicating a relationship between the absorption spectrum and the concentrations of the measurement target components are used for the above analysis. The calibration curve data are previously created on a per measurement target component basis by prescribing a plurality of measurement target components that would be contained in the sample gas, and by correcting interference of these measurement target components.

However, when a component not being prescribed is contained in the sample gas, calibration curve data are created without taking the interference of the component into consideration. This makes it impossible to accurately calculate a concentration of each of the measurement target components.

Even so, in the case of prescribing all possible compounds as a measurement target component that would be contained in the sample gas, it becomes necessary to consider interference among all the possible compounds, thus deteriorating accuracy of the calibration curve data.

PRIOR ART DOCUMENT

Patent Document

Patent Document 1: Japanese Patent No. 2926277

SUMMARY OF THE INVENTION

Problems to be Solved by the Invention

Accordingly, the present invention has been made to solve the above problems once for all, and has for its main object to make it possible to carry out an analysis using highly accurate calibration curve data obtained by correcting influences of only components contained in a sample gas without correcting any influence of a component not being contained in the sample gas.

Means of Solving the Problems

In one aspect of the present invention, a gas analysis apparatus is intended to calculate a concentration of a measurement target component by using calibration curve data indicating a relationship between an optical spectrum obtainable by irradiating light to a sample gas and a concentration of the measurement target component contained in the sample gas. The gas analysis apparatus includes a calibration curve data storage section and a concentration calculation section. The calibration curve data storage section is configured to store N types of calibration curve data which are previously created for N types of measurement target components and obtained by correcting influences of other N−1 types of measurement target components with respect to a concentration of each of the measurement target components. The concentration calculation section is configured to calculate a concentration of each of the measurement target components by using the N types of calibration curve data. When there exists a subthreshold component whose concentration calculated by the concentration calculation section is not more than a predetermined threshold value, the concentration calculation section calculates a concentration of each of the measurement target components other than the subthreshold component by using calibration curve data obtained without correcting an influence of the subthreshold component.

Here, N is a natural number.

With the gas analysis apparatus thus configured, when a subthreshold component exists among the measurement target components, the concentrations of the measurement target components, which are obtained by excluding the subthreshold component from the N types of measurement target components, are calculated using the calibration curve data obtained without correcting the influence of the subthreshold component. It is therefore possible to carry out an analysis using the highly accurate calibration curve data obtained by correcting the influences of the components contained in the sample gas without correcting the influence of the subthreshold component.

In order to calculate the concentrations of the measurement target components contained in the sample gas with higher accuracy, the concentration calculation section preferably repeats a concentration calculation for the measurement target components until the subthreshold component becomes undetectable, or a predetermined number of times.

Assuming that mutually affecting measurement target components are, for example, CO, $CO_2$, and NO, there are seven combinations in which these three components are contained in a sample gas, namely, (CO, $CO_2$, and NO), (CO and $CO_2$,), (CO and NO), ($CO_2$ and NO), (CO), ($CO_2$), and (NO).

Here, it is assumed that the calibration curve data storage section previously stores, as N types of calibration curve data, three types of calibration curve data necessary in cases where these three components (CO, $CO_2$, and NO) are contained in the sample gas. Specifically, these three types of calibration curve data are as follows:

Three-type component calibration curve data [CO] for CO obtained by correcting the influences of $CO_2$ and NO;

Three-type component calibration curve data [$CO_2$] for $CO_2$ obtained by correcting the influences of CO and NO; and Three-type component calibration curve data [NO] for NO obtained by correcting the influences of CO and $CO_2$ Then, the concentration calculation section calculates concentrations of these three components by using the three types of calibration curve data. When a subthreshold component exists as a result of the calculations, calibration curve data that can become necessary next are two types of calibration curve data obtained by correcting influences between two components which are necessary when the sample gas contains two components of (CO and $CO_2$), (CO and NO), or ($CO_2$ and NO), and single component calibration curve data obtained without correcting the influence of another component which are necessary when the sample gas contains one component of (CO), ($CO_2$), or (NO).

Hence, the calibration curve data storage section preferably previously stores calibration curve data that can become necessary for the next concentration calculation when a subthreshold component exists among the N types of measurement target components.

In an embodiment therefor, the calibration curve data storage section preferably stores, besides the N types of calibration curve data, calibration curve data obtained by correcting an influence of another or other multiple types of measurement target components with respect to concentrations of the N types of measurement target components, and calibration curve data obtained without correcting an influence of any other measurement target component with respect to the N types of measurement target components.

When a trace amount of the excluded subthreshold component is actually contained in the sample gas, calibration curve data obtained without correcting the influence of the subthreshold component may be used. Consequently, a calculated concentration may have, for example, a negative value or an abnormally large value. No accurate analysis result is obtainable from such an abnormal value.

To make it possible to obtain a concentration including no abnormal value, it is preferable to include an abnormal value detection section and an output section. The abnormal value detection section is configured to detect whether an abnormal value exists among concentrations of measurement target components other than the subthreshold component which are calculated by the concentration calculation section. The output section is configured to output concentrations of measurement target components calculated immediately before by the concentration calculation section when an abnormal value is detected by the abnormal value detection section.

In another aspect intended for cases where an abnormal value exists among calculated concentrations, the concentration calculation section may be configured to recalculate a concentration of each of measurement target components before excluding the subthreshold component by changing the threshold value when an abnormal value is detected by the abnormal value detection section.

With this configuration, a recalculation is carried out by changing the threshold value with respect to the concentrations of the measurement target components. Therefore, a trace amount of a component contained in the sample gas cannot be considered as a subthreshold component. This makes it possible to carry out concentration measurement using highly accurate calibration curve data obtained by correcting the influence of the component.

In the wet measurement described in the background art, piping and an analyzer are heated and retained at, for example, a predetermined heating temperature because measurement target components may be subjected to change in concentration or the like when moisture and gas having a low boiling point condense in the piping that permits passage of a sample gas.

From the above, it has conventionally been considered that any high boiling point compound whose boiling point is higher than the heating temperature does not exist in a gas state and is not contained in the sample gas. This leads to use of calibration curve data obtained without correcting interference of the high boiling point compound.

However, even when a temperature of exhaust gas is controlled at the heating temperature, a trace amount of the high boiling point compound may be contained in the sample gas. If so, the influences of the high boiling point compound may occur, thus causing an error in measured concentrations of the measurement target components.

Hence, the N types of calibration curve data are preferably those obtainable by correcting an influence of a high boiling point compound whose boiling point is higher than a heating temperature of an analyzer that permits introduction of the sample gas.

With this configuration, if a high boiling point compound is contained in a sample gas, it is possible to carry out concentration measurement using calibration curve data obtained by correcting the influence of the high boiling point compound, thereby further improving measurement accuracy.

It is preferably to further include a qualitative analysis data acceptance section configured to accept qualitative analysis data obtained by subjecting the sample gas to a qualitative analysis.

With this configuration, it is possible to check whether, for example, no subthreshold component is surely contained in the sample gas by checking qualitative analysis results indicated by the qualitative analysis data.

In one aspect of the present invention, a program for a gas analysis apparatus is intended to be used for a gas analysis apparatus intended to calculate a concentration of a measurement target component by using calibration curve data indicating a relationship between an optical spectrum obtainable by irradiating light to a sample gas and a concentration of the measurement target component contained in the sample gas. The program is designed to cause a computer to perform a function as a calibration curve data storage section, and a function as a concentration calculation section. The calibration curve data storage section is designed to store N types of calibration curve data which are previously created for N types of measurement target components and obtained by correcting influences of other N−1 types of measurement target components with respect to a concentration of each of the measurement target components. The concentration calculation section is designed to calculate a concentration of each of the measurement target components by using the N types of calibration curve data. When there exists a subthreshold component whose concentration calculated by the concentration calculation section is not more than a predetermined threshold value, the concentration calculation section is designed to calculate a concentration of each of the measurement target components other than the subthreshold component by using calibration curve data obtained without correcting an influence of the subthreshold component.

Here, N is a natural number.

In one aspect of the present invention, a gas analysis method is intended to use a gas analysis apparatus designed to calculate a concentration of a measurement target component by using calibration curve data indicating a relationship between an optical spectrum obtainable by irradiating light to a sample gas and a concentration of the measurement target component contained in the sample gas. The gas analysis method includes the steps of; storing N types of calibration curve data which are previously created for N types of measurement target components and obtained by correcting influences of other N−1 types of measurement target components with respect to a concentration of each of the measurement target components; calculating a concentration of a measurement target component by using the N types of calibration curve data; and calculating, when there exists a subthreshold component whose concentration calculated by the concentration calculation section is not more than a predetermined threshold value, a concentration of each of the measurement target components other than the subthreshold component by using calibration curve data obtained without correcting an influence of the subthreshold component.

Here, N is a natural number.

With the program for the gas analysis apparatus and the gas analysis method, it is possible to produce the same operation advantage as that in the above gas analysis apparatus.

Effects of the Invention

With the present invention thus configured, it is possible to carry out an analysis using highly accurate calibration curve data obtained by correcting the influence of a component contained in a sample gas without correcting the influence of a component not contained in the sample gas.

DESCRIPTION OF THE EMBODIMENTS

One embodiment of a gas analysis apparatus in the present invention is described below with reference to the drawings.

The gas analysis apparatus 100 of the present embodiment is intended to measure a concentration of each of multiple components contained in a sample gas by carrying out a multivariate analysis of an absorption spectrum obtainable by irradiating light to exhaust gas (sample gas) discharged from an internal combustion engine, such as an automobile engine. Alternatively, the gas analysis apparatus 100 may be used for measuring exhaust gas discharged from an internal combustion engine mounted on a mobile object, such as a ship or airplane.

Figure 1:
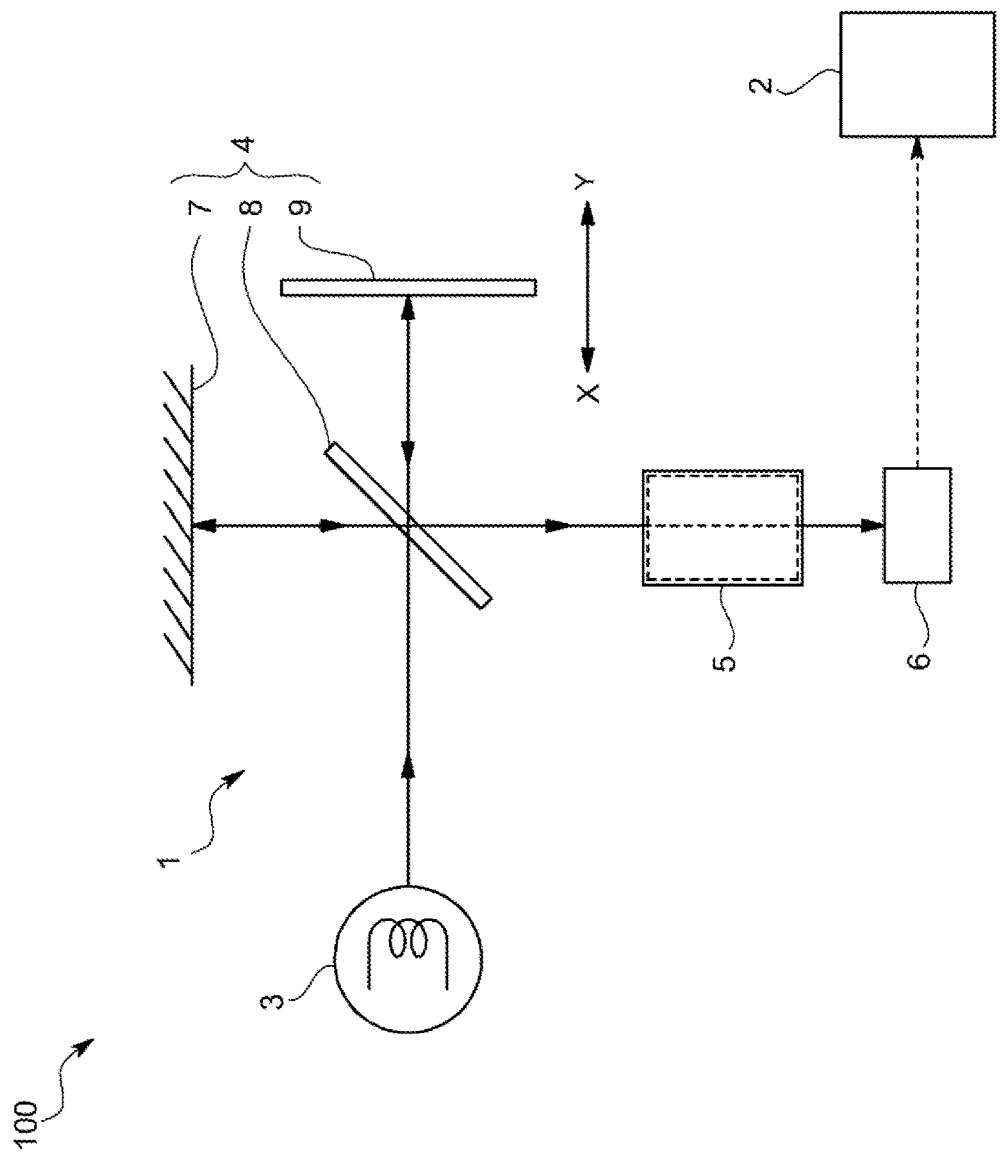
FIG. 1 is a schematic diagram illustrating a configuration of a gas analysis apparatus in an embodiment.

Specifically, the gas analysis apparatus 100 is designed to continuously measure the concentrations of components contained in the sample gas by FTIR method. As illustrated in FIG. 1, the gas analysis apparatus 100 includes an analysis section (analyzer) 1 to output an interferogram, and an information processor 2 to process the interferogram that is output of the analysis section 1.

The analysis section 1 includes an infrared light source 3, an interference mechanism 4, a measurement cell 5, and a light detector 6. The infrared light source 3 is designed to emit infrared light. The interference mechanism 4 is designed to interfere with infrared light from the infrared light source 3 and output the infrared light. The measurement cell 5 is designed to accommodate exhaust gas, and to which the infrared light from the infrared light source 3 is irradiated through the interference mechanism 4. The light detector 6 is designed to receive the infrared light after passing through the measurement cell 5. The interference mechanism 4 is made up of a stationary mirror 7, a beam splitter 8, and a moving mirror 9 subjected to parallel movement in, for example, X and Y directions by a drive mechanism (not illustrated).

Figure 2:
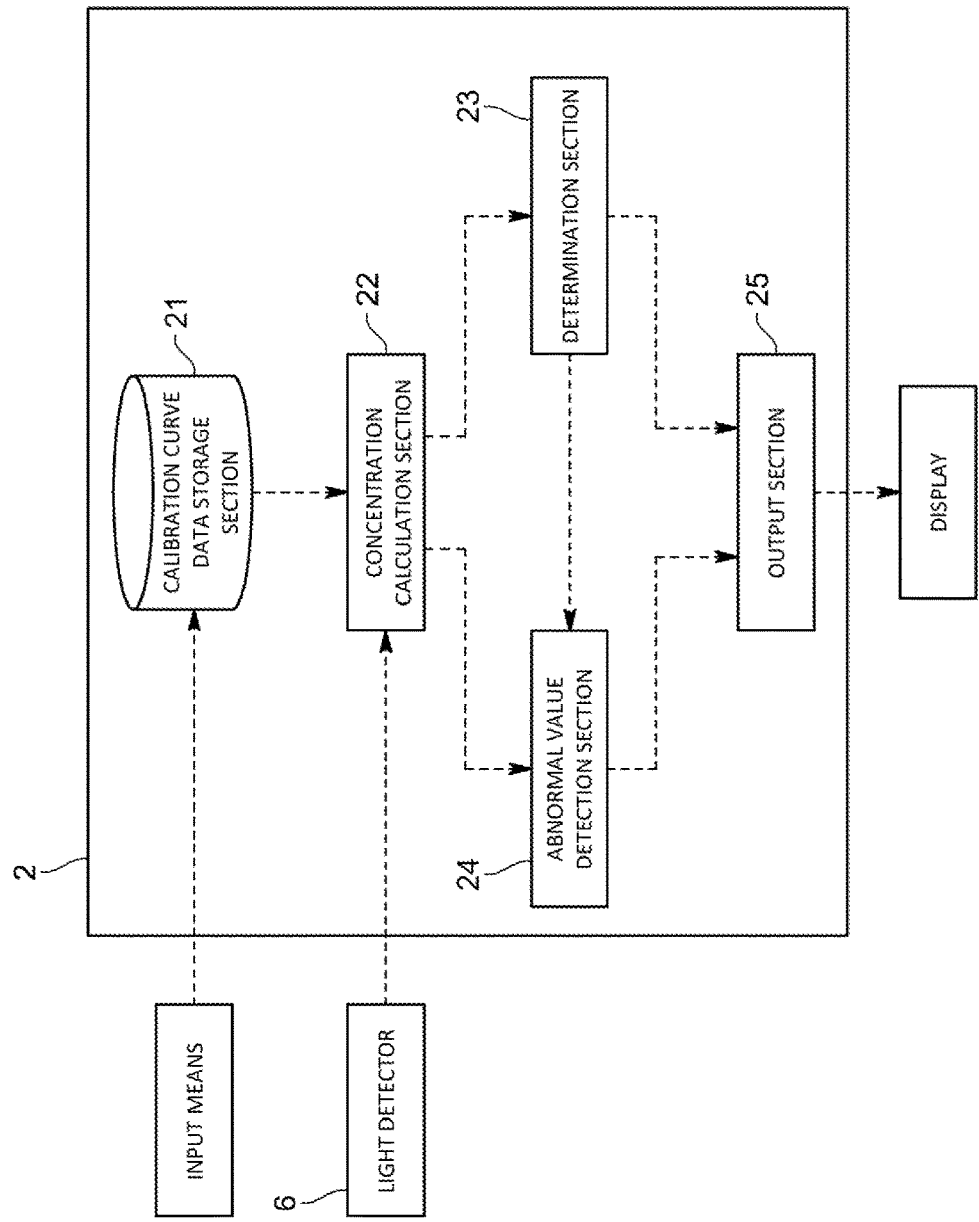
FIG. 2 is a functional block diagram illustrating functions of an information processor in the embodiment.

The information processor 2 is a general and special purpose computer including, for example, a CPU, memory, an input/output interface, and an AD convertor. As illustrated in FIG. 2, the information processor 2 performs functions as at least a calibration curve data storage section 21 and a concentration calculation section 22 by causing the CPU and peripheral devices to cooperate with each other according to a predetermined program being stored in a predetermined region of the memory.

The calibration curve data storage section 21 is designed to store calibration curve data necessary for calculating a concentration of each of measurement target components in association with each of the measurement target components. Here, the calibration curve data are data which are obtainable by correcting interference of other measurement target components with respect to a concentration of each of the measurement target components, and which are data being previously inputted through an input means by a user. Specifically, for example, when the user estimates that exhaust gas contains N types of measurement target components, the user inputs calibration curve data in association with each of N types of measurement target components so as to be stored in the calibration curve data storage section 21. Here, N is a natural number not less than 2.

Here, the calibration curve data are the data which are obtainable by correcting the interference of other measurement target components with respect to each of the measurement target components as described above, and which become data that differ depending on how many types of interference of these other measurement target components are corrected.

The calibration curve data storage section 21 in the present embodiment previously stores at least N types of calibration curve data (hereinafter referred to as N-type component calibration curve data obtained by correcting the interference of N−1 types of measurement target components obtained by excluding itself from the N types, namely, all the measurement target components of N types other than itself.

Here, the case where N=3 is considered. Specifically, assuming that exhaust gas contains three types, such as CO, $CO_2$, and NO, as measurement target components that mutually exert interference, three-type component calibration curve data are calibration curve data obtained by correcting interference of two measurement target components other than itself. There are three types of the three-type component calibration curve data, specifically as follows:

Three-type component calibration curve data [CO] for CO obtained by correcting the interference of $CO_2$ and NO;

Three-type component calibration curve data [$CO_2$] for $CO_2$ obtained by correcting the interference of CO and NO; and Three-type component calibration curve data [NO] for NO obtained by correcting the interference of CO and $CO_2$ The calibration curve data storage section 21 in the present embodiment stores, besides the N-type component calibration curve data described above, calibration curve data obtained by correcting influences of another or a plurality of other types of measurement target components with respect to the concentrations of the N types of measurement target components (hereinafter those as combinations of these calibration curve data and the N-type component calibration curve data are referred to as multiple-type component calibration curve data). In other words, the multiple-type component calibration curve data are calibration curve data for each of the N types of measurement target components, and the calibration curve data obtained by correcting the interference of each of combinations of the N−1 types of measurement target components other than itself.

When N=3, the multiple-type component calibration curve data are the above-mentioned three types of the three-type component calibration curve data and six types of two-type component calibration curve data. Assuming that exhaust gas contains the three types of CO, $CO_2$, and NO, the six types of two-type component calibration curve data are as follows:

Two-type component calibration curve data [CO-1] for CO obtained by correcting the interference of $CO_2$;

Two-type component calibration curve data [CO-2] for CO obtained by correcting the interference of NO;

Two-type component calibration curve data [$CO_2$-1] for $CO_2$ obtained by correcting the interference of CO;

Two-type component calibration curve data [$CO_2$-2] for $CO_2$ obtained by correcting the interference of NO;

Two-type component calibration curve data [NO-1] for NO obtained by correcting the interference of CO; and Two-type component calibration curve data [NO-2] for NO obtained by correcting the interference of $CO_2$ Possible multiple-type component calibration curve data with respect to the N types of measurement target components, namely, the multiple-type component calibration curve data obtainable from all combinations of N−1 types of measurement target components other than itself can be expressed using N, and there are Z types that can be expressed by the following equation (1);

$$Z = \sum_{k=1}^{N-1} ({}_N C_1 \times {}_{N-1} C_k) \quad (1)$$

In the equation (1), a term of ${}_N C_1$ indicates calibration curve data of any one of N types of measurement target components, and a term of ${}_{N-1} C_k$ indicates combinations of N−1 types of measurement target components other than itself.

The calibration curve data storage section 21 in the present embodiment further previously stores calibration curve data for each of the N types of measurement target components which are not subjected to correction of the interference of other components (hereinafter referred to as single component calibration curve data).

When N=3, there are three types of single component calibration curve data. Assuming that exhaust gas contains three types of CO, $CO_2$, and NO, the details are as follows:

Single component calibration curve data for CO [CO (origin)];

Single component calibration curve data for $CO_2$ [$CO_2$ (origin)]; and

Single component calibration curve data for NO [NO (origin)]

Thus in the present embodiment, the calibration curve data storage section 21 is designed to previously store not only the N types of component calibration curve data but also the N−1 types of component calibration curve data, N−2 types of component calibration curve data, . . . , the two-type component calibration curve data, and the single component calibration curve data with respect to each of the N types of measurement target components.

The concentration calculation section 22 is designed to calculate a concentration of each of measurement target components by accepting an interferogram outputted from the light detector 6 of the analysis section 1, and by acquiring calibration curve data being stored in the calibration curve data storage section 21.

Specifically, the concentration calculation section 22 obtains a power spectrum by subjecting each of an interferogram of reference gas (for example, nitrogen gas) and an interferogram of exhaust gas to Fourier transform, and then finds a ratio of the power spectrum of the exhaust gas to the power spectrum of the reference gas. The concentration calculation section 22 converts the ratio to an absorbance scale so as to calculate the concentration of each of the measurement target components contained in the exhaust gas on the basis of absorbances at a plurality of wavenumber points in an absorption spectrum.

As illustrated in FIG. 2, the information processor 2 in the present embodiment further includes functions as a determination section 23, an abnormal value detection section 24, and an output section 25.

Figure 3:
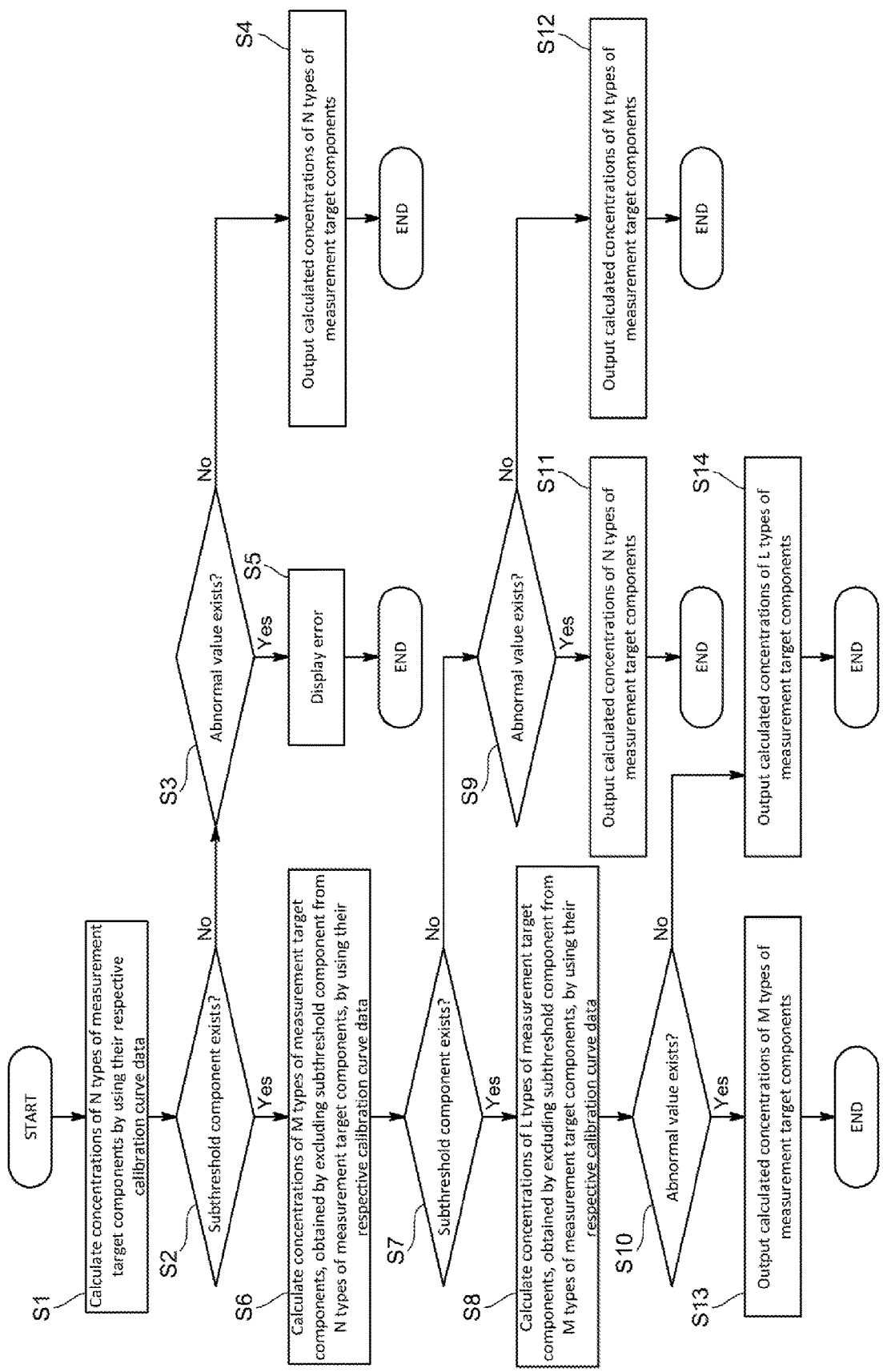
FIG. 3 is a flowchart illustrating operations of the information processor in the embodiment.

Operations of the information processor 2 in the present embodiment are described below while also describing the individual sections with reference to the flowchart of FIG. 3.

Upon introduction of exhaust gas into the analysis section 1, the concentration calculation section 22 firstly calculates a concentration of each of N types of measurement target components by accepting an interferogram outputted from the analysis section 1, and by acquiring the N-type component calibration curve data necessitated when the exhaust gas contains all of the N types of measurement target components from the calibration curve data storage section 21 (S1). Calculated concentration data indicating the concentrations thus calculated are outputted to the determination section 23. Here, the concentration calculation section 22 does not necessarily need to calculate all of the N types of measurement target components or alternatively may calculate a concentration of a predetermined part of the N types of measurement target components.

Subsequently, the determination section 23 makes a determination whether there exists such a subthreshold component that can be considered as not being present in the exhaust gas, from each of the calculated concentrations of the measurement target components indicated by calculated concentration data ($S_2$). Specifically, the determination section 23 detects, as the subthreshold component, a measurement target component whose calculated concentration is less than a preset first threshold value by comparing the calculated concentration of each of the measurement target components and the first threshold value.

When no subthreshold component is detected in S2, it follows that a signal indicating this is outputted from the determination section 23 to the abnormal value detection section 24, and the calculated concentration data obtained in S1 are outputted from the concentration calculation section 22 to the abnormal value detection section 24. Upon acquisition of the calculated concentration data obtained in S1, the abnormal value detection section 24 makes a determination whether an abnormal value exists among the calculated concentrations indicated by the calculated concentration data (S3).

Specifically, when a calculated concentration calculated by the concentration calculation section 22 is such a value that cannot be physically generated, the abnormal value detection section 24 is designed to detect the calculated concentration as an abnormal value. Here, the abnormal value detection section 24 detects, as an abnormal value, a calculated concentration having a negative value.

When no abnormal value is detected in S3, the exhaust gas contains the N types of measurement target components. Therefore, the output section 25 outputs calculated concentrations of the N types of measurement target components to, for example, a display by acquiring the calculated concentration data obtained in S1 from the abnormal value detection section 24 (S4).

When an abnormal value is detected in S3, the output section 25 outputs, for example, an error indication to the display or the like (S5).

When a subthreshold component is detected in S2, the concentration calculation section 22 calculates concentrations of M types of measurement target components which are obtained by excluding the subthreshold component from the N types of measurement target components (S6).

Here, the concentration calculation section 22 calculates concentrations of the M types of measurement target components by acquiring M-type component calibration curve data from the calibration curve data storage section 21. Calculated concentration data indicating these calculated concentrations are outputted again to the determination section 23. Here, M denotes a natural number of not more than N−1.

Similarly to S2, the determination section 23 then makes a determination whether there still exists such a subthreshold component that can be considered as not being present in the exhaust gas by comparing the calculated concentrations of the measurement target components and a preset second threshold value (S7). The second threshold value may be equal to the first threshold value or alternatively a value different from the first threshold value.

When no subthreshold component is detected in S7, a signal indicating this is outputted from the determination section 23 to the abnormal value detection section 24, and the calculated concentration data obtained in S6 are outputted from the concentration calculation section 22 to the abnormal value detection section 24.

When another subthreshold component is detected in S7, the concentration calculation section 22 calculates concentrations of L types of measurement target components which are obtained by excluding the subthreshold component from the M types of measurement target components (S8).

Here, the concentration calculation section 22 calculates concentrations of the L types of measurement target components by acquiring L-type component calibration curve data from the calibration curve data storage section 21. Calculated concentration data indicating these calculated concentrations are outputted to the abnormal value detection section 24. Here, L denotes a natural number of not more than M−1.

If the exhaust gas actually contains the subthreshold components which are respectively excluded in S6 and S8, the concentration calculation section 22 may calculate concentrations of the measurement target components by using calibration curve data not subjected to correction of the interference of the subthreshold components, and the calculated concentrations obtainable in S6 and S8 may have, for example, a negative value or an unusually large value.

Upon acquisition of the calculated concentration data obtained in S6 and S8, the abnormal value detection section 24 makes a determination whether an abnormal value exists among calculated concentrations indicated by these calculation concentration data, namely, concentrations calculated by the concentration calculation section 22 after the subthreshold components are respectively excluded in S6 and S8 (S9, S10).

Specifically, when the calculated concentration calculated by the concentration calculation section 22 is such a value that cannot be physically generated, the abnormal value detection section 24 is designed to detect the calculated concentration as an abnormal value. Here, the abnormal value detection section 24 detects, as an abnormal value, a calculated concentration having a negative value.

When the abnormal value is detected in S9, there is a possibility that the exhaust gas contains at least part of the subthreshold component excluded in S6. Although the concentration of the component is not more than the threshold value, it is conceivable that the component affects other measurement target components. Therefore, the output section 25 outputs the calculated concentrations of the N types of measurement target components to the display or the like by acquiring the calculated concentration data obtained in the previous calculation of S6 by the concentration calculation section 22, namely, the calculated concentration data obtained in S1 from a memory (not illustrated) that temporarily stores these data (S11).

When no abnormal value is detected in S9, the exhaust gas contains the M types of measurement target components. Therefore, the output section 25 outputs the calculated concentrations of the M types of measurement target components to, for example, the display by acquiring the calculated concentration data obtained in S6 from the abnormal value detection section 24 (S12).

When the abnormal value is detected in S10, there is a possibility that the exhaust gas contains at least part of the subthreshold component excluded in S8. Although the concentration of the component is not more than the threshold value, it is conceivable that the component affects other measurement target components. Therefore, the output section 25 outputs the calculated concentrations of the M types of measurement target components to the display or the like by acquiring the calculated concentration data obtained in the previous calculation of S8 by the concentration calculation section 22, namely, the calculated concentration data obtained in S6 from the memory (not illustrated) that temporarily stores these data (S13).

When no abnormal value is detected in S10, the exhaust gas contains the L types of measurement target components. Therefore, the output section 25 outputs calculated concentrations of the L types of measurement target components to, for example, the display by acquiring the calculated concentration data obtained in S8 from the abnormal value detection section 24 (S14).

With the gas analysis apparatus 100 in the present embodiment thus configured, when the subthreshold component exists among the N types of measurement target components, it is designed to calculate the concentrations of the M types of measurement target components, which are obtained by excluding the subthreshold component from the N types of measurement target components, by using the M-type component calibration curve data. The concentration calculation can be performed using accurate calibration curve data obtained by correcting the interference of the components contained in the sample gas without correcting the interference of the subthreshold component.

Moreover, when the subthreshold component exists among the M types of measurement target components, the gas analysis apparatus 100 of the present embodiment is designed to calculate the concentrations of the L types of measurement target components, which are obtained by excluding the subthreshold component from the M types of measurement target components, by using the L-type component calibration curve data. It is therefore possible to calculate the concentrations by using the L-type component calibration curve data having higher accuracy than the M-type component calibration curve data.

The calibration curve data storage section 21 is designed to previously store the multiple-type component calibration curve data obtainable from all the combinations of the N−1 types of measurement target components other than itself. Therefore, the M-type component calibration curve data and the L-type component calibration curve data are surely stored in the calibration curve data storage section 21. Thus, the gas analysis apparatus 100 of the present embodiment is capable of calculating concentrations using proper M-type component calibration curve data and L-type component calibration curve data according to the type of the measurement target component.

When, after excluding the subthreshold component, an abnormal value exists among the concentrations calculated by the concentration calculation section 22, the abnormal value detection section 24 detects the abnormal value. Therefore, upon detection of the abnormal value, it is possible to know, for example, that the measurement target component being actually contained in exhaust gas may be excluded as a subthreshold component.

The present invention is not limited to the above embodiment.

Figure 4:
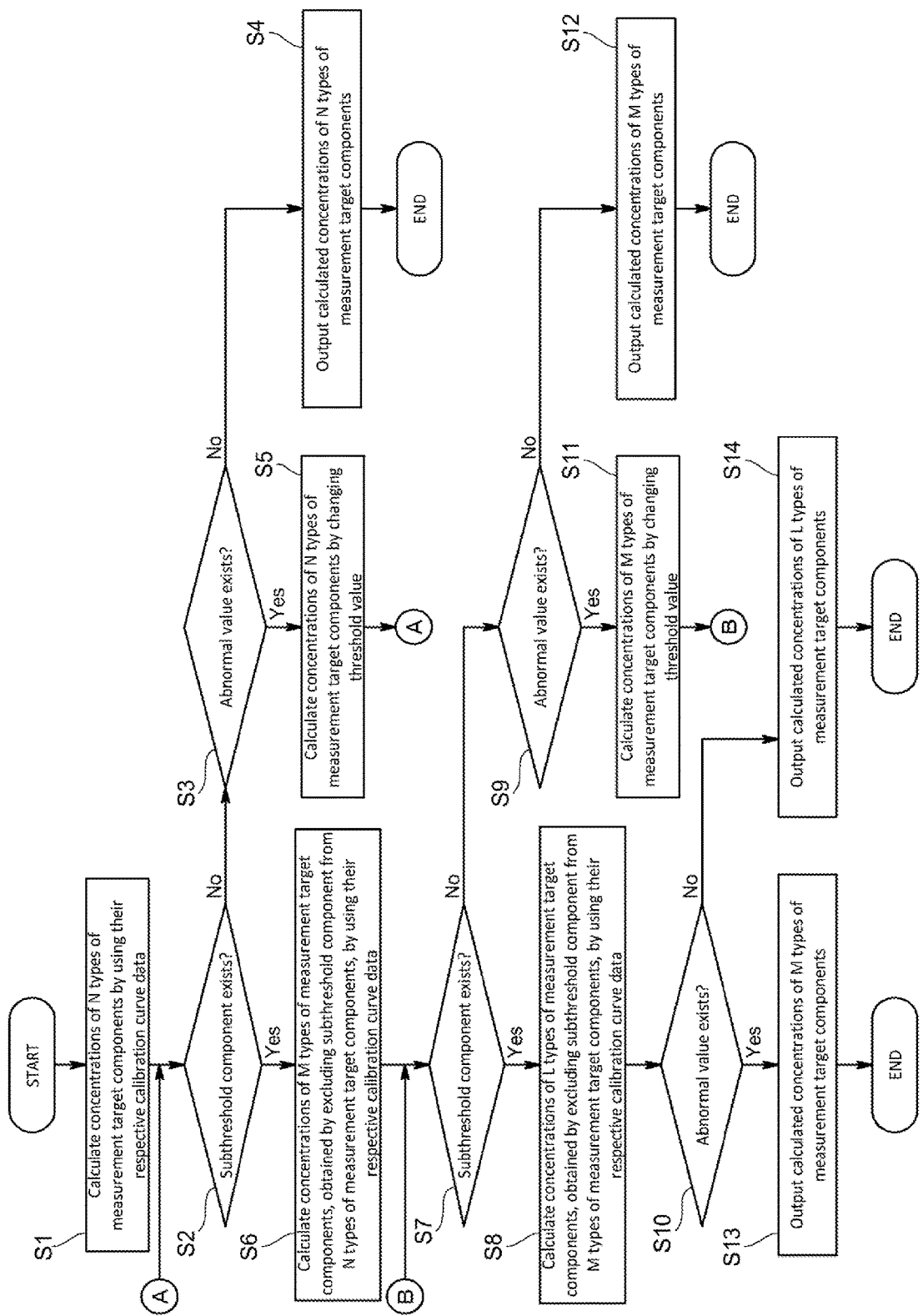
FIG. 4 is a flowchart illustrating operations of an information processor in one modified embodiment.

For example, when, after excluding the subthreshold component, an abnormal value exists among the concentrations calculated by the concentration calculation section 22, the output section 25 is designed to output the calculated concentrations obtained in the previous calculation by the concentration calculation section 22 in the above embodiment. Alternatively, as illustrated in S5 and S11 in FIG. 4, the concentration calculation section 22 may be designed to recalculate the concentrations of the measurement target components before excluding the subthreshold component so as to make a determination whether there exists a subthreshold component by lowering a threshold value (the first threshold value and the second threshold value in the above embodiment) serving as a criterion for making a determination whether a subthreshold component exists.

With this configuration, the concentrations are recalculated by lowering the threshold value of the measurement target components. This eliminates the possibility of making a determination that a trace amount of a component contained in a sample gas is a subthreshold component. It is therefore possible to carry out concentration measurement using highly accurate calibration curve data obtained by correcting interference of the component.

When an abnormal value exists among the concentrations calculated by the concentration calculation section 22, the concentration calculation section 22 may be designed to recalculate the concentrations of the measurement target components before excluding a subthreshold component by raising the threshold value.

In the above embodiment, the calibration curve data storage section 21 is designed to store the Z types of multiple-type component calibration curve data that can be expressed by the equation (1), namely, the multiple-type component calibration curve data obtainable from all combinations of N−1 types of measurement target components other than itself. It is not necessarily required to cause the calibration curve data storage section 21 to store all of the Z types. Alternatively, the calibration curve data storage section 21 may store part of the multiple-type component calibration curve data.

Figure 5:
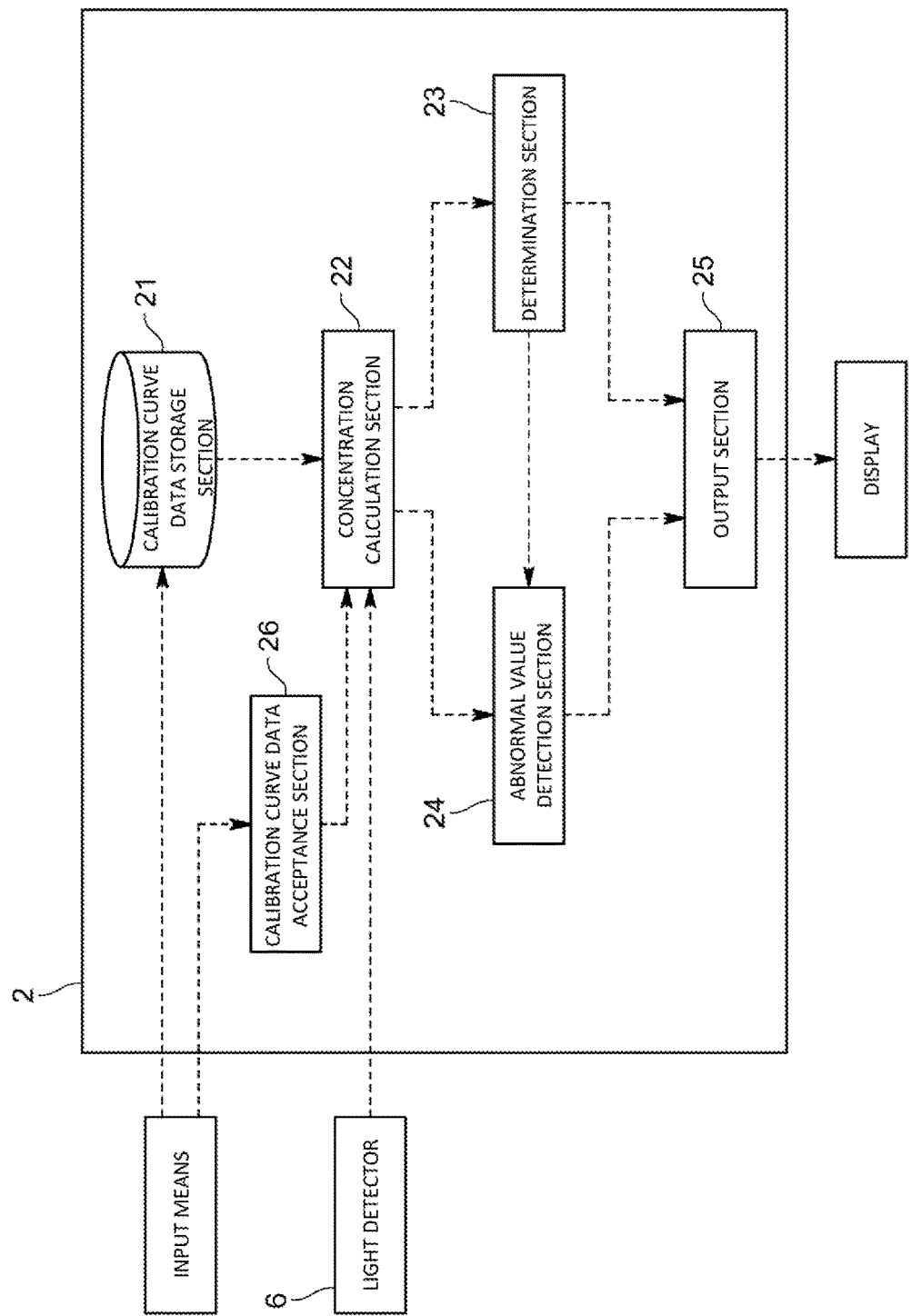
FIG. 5 is a functional block diagram illustrating functions of the information processor in the modified embodiment.

In this case, the information processor 2 preferably includes a function as a calibration curve data acceptance section 26 designed to accept calibration curve data inputted through an input means by a user as illustrated in FIG. 5.

With this configuration, as long as the calibration curve data storage section 21 is designed to previously store at least N-type component calibration curve data, it is possible to reduce capacity of the memory while making it possible to calculate concentrations using M-type component calibration curve data when a subthreshold component exists among N types of measurement target components, by separately creating, inside or outside the information processor 2, M-type component calibration curve data with respect to M types of measurement target components other than the subthreshold component, and by transmitting the M-type component calibration curve data to the calibration curve data acceptance section 26.

Although the above embodiment has described the case where the exhaust gas contains three types of CO, $CO_2$, and NO, namely, N=3, needless to say, N may be 4 or more. Specific measurement target components may be suitably changed by the user.

Moreover, even though the above embodiment has described the aspect that the concentration calculation section 22 calculates the concentrations of the measurement target components three times (specifically the concentration calculations of N types, M types, and L types of measurement target components), the concentration calculation section 22 may repeat the concentration calculation of the measurement target components until any subthreshold component becomes undetectable, namely, until the determination section 23 makes a determination that a sample gas contains no subthreshold component.

An additional description of specific measurement target components is provided below.

In a conventional wet measurement, piping is heated and retained at a predetermined heating temperature, for example, 113° C. or 191° C. because measurement target components may be subjected to change in concentration or the like when moisture and gas having a low boiling point condense in the piping that permits passage of a sample gas.

From the above, it has conventionally been considered that any high boiling point compound whose boiling point is higher than the heating temperature does not exist in a gas state and is not contained in exhaust gas. The high boiling point compound has not been considered as a component that exerts interference on other component. Consequently, the conventionally used calibration curve data are those which are obtained without correcting interference of the high boiling point compound.

However, even when a temperature of the exhaust gas is controlled at the heating temperature, a trace amount of a high boiling point compound may be contained in the sample gas. If so, the interference of the high boiling point compound may occur, thus causing an error in measured concentrations of the measurement target components.

Hence, the N-type component calibration curve data are preferably data obtained by correcting the influences of the high boiling point compound with respect to the measurement target components.

The high boiling point compound is a compound whose boiling point is higher than a heating temperature in the analysis section 1 that permits introduction of exhaust gas, more specifically a heating temperature of the measurement cell 5. Here, the boiling temperature of the compound is higher than the heating temperature of the piping that permits passage of the exhaust gas. Specifically, the high boiling point compound has a boiling point of 113° C. or higher, for example, approximately 180-350° C.

Specific examples of the high boiling point compound are components contained in a fuel, such as light oil and gasoline, which are generated due to incomplete combustion of the fuel and have a large number of carbon atoms. Examples of the high boiling point compounds include alkane having a large number of carbon atoms. The number of carbon atoms is, for example, not less than 10 and not more than 20 ($C_{10}$-$C_{20}$). Examples of the high boiling point compound may include one whose boiling point is not less than a heating temperature of a catalyst or higher when carrying out a performance evaluation of the catalyst disposed inside an exhaust pipe.

Thus, as long as the high boiling point compound is included in the N types of measurement target components, when the sample gas contains a high boiling point compound, the concentrations of the measurement target components can be calculated using the calibration curve data obtained by correcting the interference of the high boiling point compound.

When the sample gas contains no high boiling point compound, a high boiling point compound is detectable as a subthreshold component. The concentrations of the measurement target components can be therefore calculated using the calibration curve data obtained without correcting the interference of the high boiling point compound.

Alternatively, in order to obtain the foregoing operation advantage, the N-type component calibration curve data may be created by assuming that a high boiling point compound exists among the N types of measurement target components.

Figure 6:
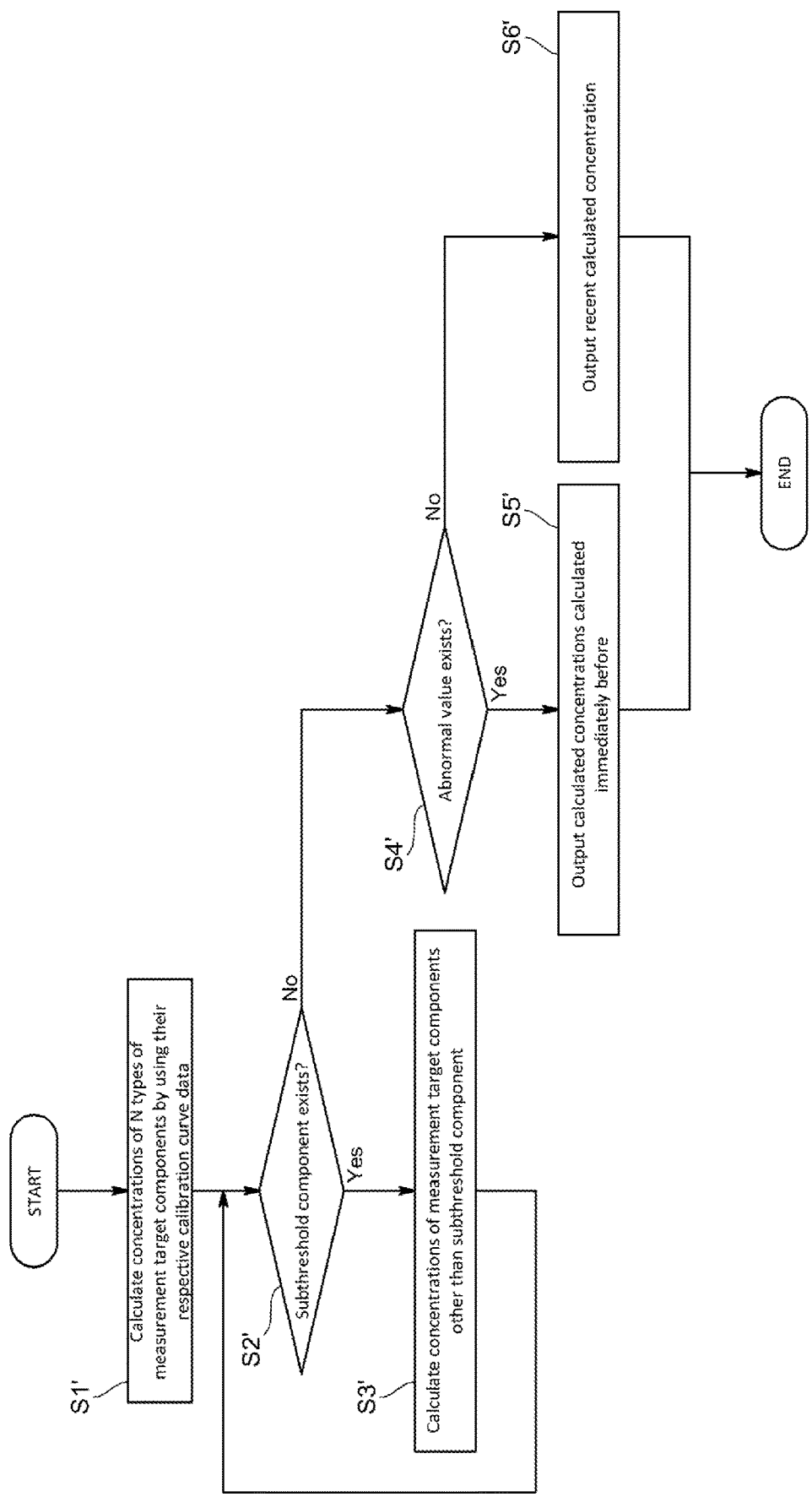
FIG. 6 is a flowchart illustrating operations of an information processor in another modified embodiment.

In the operations of the information processor 2, the determination section 23 is designed to make the determination whether there exists a subthreshold component two times in the above embodiment. Alternatively, the determination section 23 may be designed to make the determination whether there exists a subthreshold component only one time, or may be designed to repeat the determination until a determination is made that there exists no subthreshold value as illustrated in FIG. 6 (S1', S2')

As an operation performed after making the determination that there exists no subthreshold component, there is, for example, the step of making a determination whether an abnormal value exists among calculated concentrations as in the case of the above embodiment (S4').

When there exists an abnormal value in S4', the output section 25 outputs calculated concentrations calculated immediately before by the concentration calculation section 22 (S5'). When no abnormal value exists, the output section 25 outputs latest calculated concentrations calculated by the concentration calculation section 22 (S6').

Figure 7:
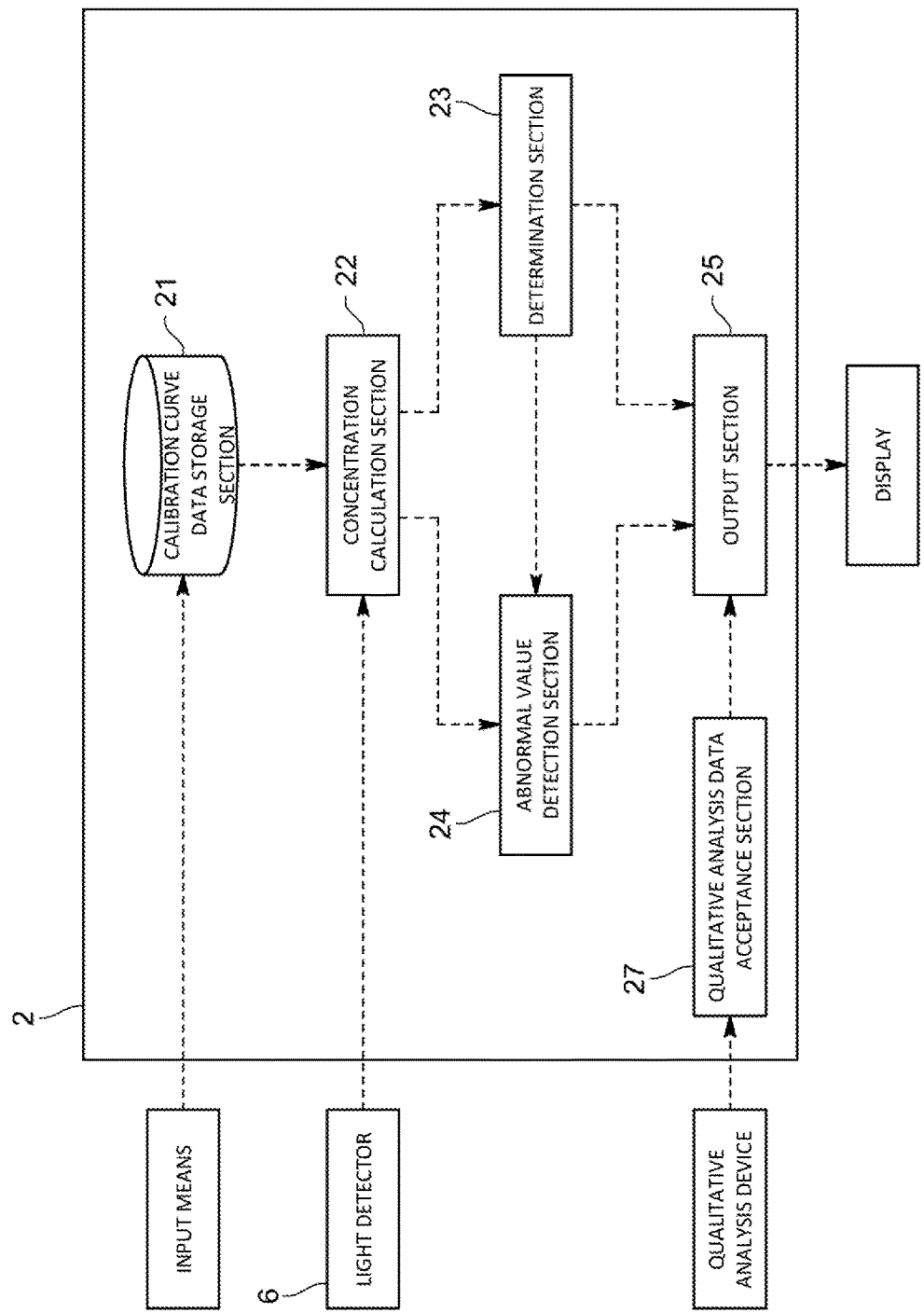
FIG. 7 is a functional block diagram illustrating functions of the information processor in the another modified embodiment.

The information processor 2 may further include a function as a qualitative analysis data acceptance section 27 designed to accept qualitative analysis data obtained by subjecting a sample gas to a qualitative analysis as illustrated in FIG. 7.

The qualitative analysis data are data that indicate components contained in a sample gas and are obtainable by a qualitative analysis device, such as a mass spectrometer, which is different from the gas analysis apparatus 100 of the present embodiment.

With this configuration, for example, it is possible to check whether exhaust gas does not surely contain a subthreshold component by causing the output section 25 to output, to the display or the like, contents of qualitative analysis data accepted by the qualitative analysis data acceptance section 27 so as to check whether multiple types of measurement target components calculated by the concentration calculation section 22 match with components indicated by qualitative analysis data.

Although the calibration curve data are the data obtained by correcting the interference of another component with respect to the measurement target components in the above embodiment, the calibration curve data may be data obtained by correcting coexistence influences of another component with respect to the measurement target components, or alternatively data obtained by correcting both of the interference and the coexistence influences. That is, the term "influences" used in the appended claims is a concept that includes the interference, the coexistence influences, or both of these influences.

Calibration curve data used when a component exerting influences on concentration of measurement target components has a low concentration may differ from calibration curve data used when the component has a high concentration.

Although the above embodiment has described the gas analysis apparatus 100 using the FTIR method for automobile exhaust gas, it is also possible to apply to various uses, such as a gas analysis apparatus using FTIR method for a reforming system of methanol intended for fuel cells.

Additionally, the gas analysis apparatus 100 in the present embodiment is not limited to one using the FTIR method. Alternatively, the gas analysis apparatus 100 may be designed to perform a qualitative analysis of multiple components contained in a sample gas by using, for example, non-dispersive infrared absorption (NDIR) method, quantum cascade laser infrared spectroscopy (QCL-IR) method, non-dispersive ultraviolet absorption (NDUV) method, or ultraviolet spectroscopy (UVA) method.

Besides those mentioned above, it will be understood that the present invention is not limited to the above-described embodiment, and various modifications may be made without departing from the spirit and scope of the present invention.

DESCRIPTION OF THE REFERENCE NUMERAL 100 gas analysis apparatus
1 analysis section
2 information processor
21 calibration curve data storage section
22 concentration calculation section
23 determination section
24 abnormal value detection section
25 output section

What is claimed is:

1. An exhaust gas analysis apparatus including a light source, a measurement cell, and a light detector, and designed to calculate a concentration of a measurement target component by using calibration curve data indicating a relationship between an optical spectrum obtainable by irradiating light to a sample gas and a concentration of the measurement target component contained in the sample gas, the gas analysis apparatus comprising:
   memory configured to store N types of calibration curve data which are previously created for N types of measurement target components and obtained by correcting influences of other N−1 types of measurement target components with respect to a concentration of each of the measurement target components, wherein N is a natural number not less than two; and
   a processor programmed to
      calculate in a first calibration mode a concentration of a measurement target component by using the N types of calibration curve data,
      compare the calculated concentration to a predetermined threshold value, and determine whether a subthreshold component exists which is a component having the calculated concentration be less than or equal to the predetermined threshold value, and
      when the subthreshold component exists, calculate in a second calibration mode a concentration of each of the measurement target components other than the subthreshold component by using calibration curve data obtained without correcting an influence of the subthreshold component, wherein when the subthreshold component exists, use of the calibration curve data obtained without correcting the influence of the subthreshold component in the second calibration mode is more accurate for calculating the concentration of each of the measurement target components other than the subthreshold component than use of the N types of calibration curve data in the first calibration mode.

2. The exhaust gas analysis apparatus according to claim 1, wherein the processor is further programmed to repeat a concentration calculation for a measurement target component until the subthreshold component becomes undetectable, or a predetermined number of times.

3. The exhaust gas analysis apparatus according to claim 1, wherein the memory is further programmed to store, besides the N types of calibration curve data, calibration curve data obtained by correcting an influence of another or other multiple types of measurement target components with respect to concentrations of the N types of measurement target components, and calibration curve data obtained without correcting an influence of any other measurement target component with respect to the N types of measurement target components.

4. The exhaust gas analysis apparatus according to claim 1, wherein the processor is further programmed to
   detect whether an abnormal value exists among concentrations of measurement target components other than the subthreshold component which are calculated by the concentration calculation section, and
   output concentrations of measurement target components calculated immediately before when an abnormal value is detected by the abnormal value detection section.

5. The exhaust gas analysis apparatus according to claim 1, wherein the processor is further programmed to
   detect whether an abnormal value exists among concentrations of measurement target components other than the subthreshold component which are calculated by the concentration calculation section, and
   when an abnormal value is detected, recalculate a concentration of each of measurement target components before excluding the subthreshold component by changing the threshold value.

6. The exhaust gas analysis apparatus according to claim 1, wherein the N types of calibration curve data are those obtained by correcting an influence of a high boiling point compound whose boiling point is higher than a heating temperature of an analyzer that permits introduction of the sample gas.

7. The exhaust gas analysis apparatus according to claim 1, wherein the processor is further programmed to accept qualitative analysis data obtained by subjecting the sample gas to a qualitative analysis.

8. A non-transitory storage medium storing a program used for an exhaust gas analysis apparatus including a light source, a measurement cell, and a light detector, and designed to calculate a concentration of a measurement target component by using calibration curve data indicating a relationship between an optical spectrum obtainable by irradiating light to a sample gas and a concentration of the measurement target component contained in the sample gas, the program being designed to cause a computer to perform functions of:
   storing N types of calibration curve data which are previously created for N types of measurement target components and obtained by correcting influences of other N−1 types of measurement target components with respect to a concentration of each of the measurement target components, wherein N is a natural number not less than two;
   calculating in a first calibration mode a concentration of a measurement target component by using the N types of calibration curve data;
   determining, by comparing the calculated concentration to a predetermined threshold value, whether a subthreshold component exists, which is a component having the calculated concentration be less than or equal to the predetermined threshold value, and
   when the subthreshold component exists, calculating in a second calibration mode a concentration of each of the measurement target components other than the subthreshold component using calibration curve data obtained without correcting an influence of the subthreshold component, wherein when the subthreshold component exists, use of the calibration curve data obtained without correcting the influence of the subthreshold component in the second calibration mode is more accurate for calculating the concentration of each of the measurement target components other than the subthreshold component than use of the N types of calibration curve data in the first calibration mode.

9. An exhaust gas analysis method using an exhaust gas analysis apparatus including a light source, a measurement cell, and a light detector, and designed to calculate a concentration of a measurement target component by using calibration curve data indicating a relationship between an optical spectrum obtainable by irradiating light to a sample gas and a concentration of the measurement target component contained in the sample gas, the gas analysis method comprising:

storing N types of calibration curve data which are previously created for N types of measurement target components and obtained by correcting influences of other N−1 types of measurement target components with respect to a concentration of each of the measurement target components, wherein N is a natural number not less than two;

calculating in a first calibration mode a concentration of a measurement target component by using the N types of calibration curve data;

determining, by comparing the calculated concentration to a predetermined threshold value, whether a subthreshold component exists, which is a component having the calculated concentration be less than or equal to the predetermined threshold value; and calculating, when the subthreshold component exists, in a second calibration mode a concentration of each of the measurement target components other than the subthreshold component using calibration curve data obtained without correcting an influence of the subthreshold component, wherein when the subthreshold component exists, use of the calibration curve data obtained without correcting the influence of the subthreshold component in the second calibration mode is more accurate for calculating the concentration of each of the measurement target components other than the subthreshold component than use of the N types of calibration curve data in the first calibration mode.

* * * * *